(12) United States Patent
Burns et al.

(10) Patent No.: US 11,136,902 B2
(45) Date of Patent: Oct. 5, 2021

(54) METHOD OF FORMING A THERMAL BARRIER COATING SYSTEM WITH ENGINEERED SURFACE ROUGHNESS

(71) Applicant: Mikro Systems, Inc., Charlottesville, VA (US)

(72) Inventors: Andrew J. Burns, Longwood, FL (US); Gary B. Merrill, Orlando, FL (US); John R. Paulus, Afton, VA (US)

(73) Assignees: SIEMENS ENERGY, INC., Orlando, FL (US); MIKRO SYSTEMS, INC., Charlottesville, VA (US)

( * ) Notice: Subject to any disclaimer, the term of this patent is extended or adjusted under 35 U.S.C. 154(b) by 1084 days.

(21) Appl. No.: 14/620,633

(22) Filed: Feb. 12, 2015

(65) Prior Publication Data

US 2015/0159511 A1 Jun. 11, 2015

Related U.S. Application Data

(63) Continuation-in-part of application No. 13/221,077, filed on Aug. 30, 2011, now Pat. No. 9,056,354, and
(Continued)

(51) Int. Cl.
| | |
|---|---|
| *F01D 25/00* | (2006.01) |
| *C04B 35/622* | (2006.01) |
| *B22F 7/02* | (2006.01) |
| *B22F 3/22* | (2006.01) |
| *B22F 5/04* | (2006.01) |

(Continued)

(52) U.S. Cl.
CPC .............. *F01D 25/007* (2013.01); *B22F 3/22* (2013.01); *B22F 5/04* (2013.01); *B22F 7/02* (2013.01); *B22F 7/06* (2013.01); *C04B 35/62222* (2013.01); *C23C 24/08* (2013.01); *F01D 25/005* (2013.01); *B22F 2005/005* (2013.01); *Y10T 428/12472* (2015.01); *Y10T 428/239* (2015.01); *Y10T 428/24355* (2015.01); *Y10T 428/24529* (2015.01); *Y10T 428/24545* (2015.01)

(58) Field of Classification Search
CPC ........ F01D 25/007; F01D 25/005; B22F 7/02; C04B 35/62222
USPC .................... 428/76, 162, 612, 164
See application file for complete search history.

(56) References Cited

U.S. PATENT DOCUMENTS

| | | |
|---|---|---|
| 3,284,174 A | 11/1966 | Zimmer |
| 4,283,441 A | 8/1981 | Haecker |
| (Continued) | | |

FOREIGN PATENT DOCUMENTS

| | | |
|---|---|---|
| DE | 19857591 | 6/2000 |
| EP | 0967835 | 12/1999 |
| (Continued) | | |

*Primary Examiner* — Tahseen Khan
(74) *Attorney, Agent, or Firm* — Cantor Colburn LLP

(57) ABSTRACT

A method of manufacturing a substrate (16) with a ceramic thermal barrier coating (28, 32). The interface between layers of the coating contains an engineered surface roughness (12, 24) to enhance the mechanical integrity of the bond there between. The surface roughness is formed in a surface of a mold (10,20) and is infused by a subsequently cast layer of material (16, 28). The substrate may be partially sintered (76) prior to application of the coating layer(s) and the coated substrate and coating layer(s) may be co-sintered to form a fully coherent strain-free interlayer.

14 Claims, 2 Drawing Sheets

Related U.S. Application Data a continuation of application No. 13/268,101, filed on Oct. 7, 2011, now Pat. No. 8,999,226.

(51) Int. Cl.
  *B22F 7/06* (2006.01)
  *C23C 24/08* (2006.01)
  *B22F 5/00* (2006.01)

(56) References Cited

U.S. PATENT DOCUMENTS

| | | | |
|---|---|---|---|
| 4,296,148 A | 10/1981 | Friese | |
| 4,434,211 A | 2/1984 | Shoher | |
| 4,769,294 A | 9/1988 | Barringer | |
| 4,835,039 A | 5/1989 | Barringer | |
| 5,279,909 A | 1/1994 | Horner | |
| 5,350,637 A | 9/1994 | Ketcham | |
| 5,455,000 A | 10/1995 | Seyferth | |
| 5,908,713 A | 6/1999 | Ruka | |
| 6,235,370 B1 | 3/2001 | Merrill | |
| 6,384,365 B1 | 5/2002 | Seth | |
| 6,576,182 B1 | 6/2003 | Ravagni | |
| 6,953,603 B2 | 10/2005 | Nonninger | |
| 6,984,277 B2 | 1/2006 | Morrison | |
| 7,094,450 B2 | 8/2006 | Nagaraj | |
| 7,141,812 B2 | 11/2006 | Appleby | |
| 7,182,581 B2 | 2/2007 | Bostanjoglo | |
| 7,247,002 B2 | 7/2007 | Albrecht | |
| 7,387,758 B2 | 6/2008 | Merrill | |
| 7,413,798 B2 | 8/2008 | Burns | |
| 7,462,852 B2 | 12/2008 | Appleby | |
| 7,648,605 B2 | 1/2010 | Merrill | |
| 7,744,351 B2 | 6/2010 | Jabado | |
| 7,785,098 B1 * | 8/2010 | Appleby | G21K 1/02 425/470 |
| 8,101,280 B2 | 1/2012 | Akarsu | |
| 9,315,663 B2 * | 4/2016 | Appleby | B22C 9/04 |
| 2003/0111714 A1 | 6/2003 | Bates | |
| 2003/0142463 A1 | 7/2003 | Nakamura | |
| 2003/0207155 A1 * | 11/2003 | Morrison | B32B 18/00 428/699 |
| 2003/0235272 A1 * | 12/2003 | Appleby | B29C 33/302 378/147 |
| 2004/0009333 A1 | 1/2004 | Miyazaki | |
| 2005/0249602 A1 | 11/2005 | Freling | |
| 2006/0121265 A1 | 6/2006 | Thompson | |
| 2007/0141269 A1 | 6/2007 | Stowell | |
| 2007/0205102 A1 | 9/2007 | Scholl | |
| 2008/0279678 A1 | 11/2008 | Merrill | |
| 2009/0183850 A1 | 7/2009 | Morrison | |
| 2010/0092662 A1 | 4/2010 | Halberstadt | |
| 2010/0119777 A1 | 5/2010 | Merrill | |
| 2011/0189440 A1 * | 8/2011 | Appleby | B22C 9/04 428/156 |
| 2013/0177740 A1 | 1/2013 | Merrill | |
| 2013/0052415 A1 * | 2/2013 | Burns | F01D 25/007 428/141 |
| 2013/0307123 A1 | 11/2013 | Song | |
| 2015/0030826 A1 * | 1/2015 | Kamel | F01D 11/18 428/209 |

FOREIGN PATENT DOCUMENTS

| | | |
|---|---|---|
| EP | 1172460 | 1/2002 |
| EP | 1522604 | 4/2005 |
| WO | WO0172664 | 10/2001 |
| WO | WO04/071631 | 8/2004 |

\* cited by examiner

METHOD OF FORMING A THERMAL BARRIER COATING SYSTEM WITH ENGINEERED SURFACE ROUGHNESS

This application is a continuation-in-part of co-pending application Ser. No. 13/221,077 filed 30 Aug. 2011 which is incorporated by reference herein in its entirety.

FIELD OF THE INVENTION

This invention relates generally to ceramic coated metal components and to methods for applying such coatings.

BACKGROUND OF THE INVENTION

It is known to use ceramic thermal barrier coatings to protect metallic parts that are exposed to hot combustion gas in a gas turbine engine. United States Patent Application Publication US 2009/0110954 A1 describes known thermal barrier coating systems which typically include a bond coat material deposited between the ceramic thermal barrier coating and the underlying metal substrate. It is also known that improved adherence of the thermal barrier coating can be achieved by providing a roughened surface on the bond coat material, such as by controlling the process parameters used to deposit the bond coat material. One such technique is described in United States Patent Application Publication US 2010/0092662 A1.

BRIEF DESCRIPTION OF THE DRAWINGS

The invention is explained in the following description in view of the drawings that show.

DETAILED DESCRIPTION OF THE INVENTION

The present inventors have recognized a need for further improvements in techniques for enhancing the adhesion of a ceramic thermal barrier coating. For example, while it is known to affect the surface roughness of a bond coat material by controlling the spray parameters by which the material is deposited, the present inventors have found that such spray process controls may be inadequate for some advanced gas turbine engine applications due to variability in the structure of the mechanical interface between layers in the thermal barrier coating system over multiple applications of a process.

Figure 1:
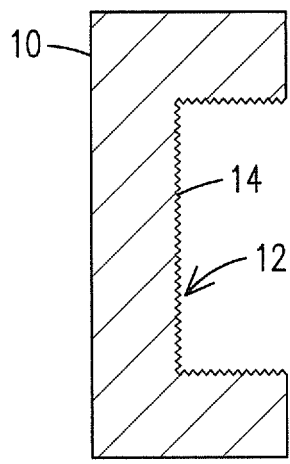
FIGS. 1 through 5 illustrate steps in a method in accordance with an embodiment of the invention.
Figure 2:
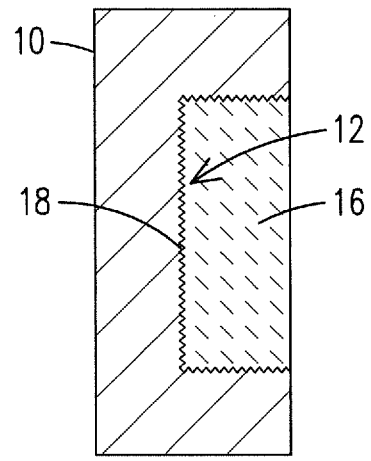

FIGS. 1-6 illustrate the steps of a method in accordance with one embodiment of the present invention. In FIG. 1, a mold 10 (substrate mold) is formed to have a first designed surface roughness 12 on an interior surface 14. The surface roughness 12 is not a randomly derived topography, such as might be achieved through a sand blasting or spraying process, but rather is an engineered surface that is specifically designed to have desired surface feature geometries and sizes. Such designed surface topographies may be formed by a tomo-lithographic process, as described in U.S. Pat. No. 7,141,812, or by any other known process. This substrate mold is used to cast a green body 16 as shown in FIG. 2, thereby replicating the designed surface roughness 12 onto an exterior surface 18 of the green body 16. The green body 16 may be cast from a ceramic or metal powder slurry, for example, and may be in the shape of a substrate of a component for a gas turbine engine.

Figure 3:
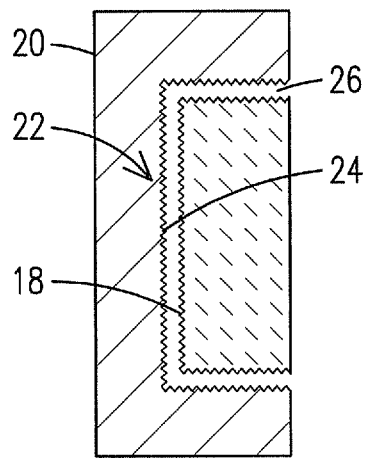

Another mold 20 (bond layer mold) is formed to have another designed surface roughness 22 on an interior surface 24 as illustrated in FIG. 3. Here, again, the surface roughness 22 is not a randomly derived topography, but rather is an engineered surface that is specifically designed to have desired surface feature geometries and sizes. The green body 16 is removed from the mold 10 and is positioned within mold 20 with a small controlled space 26 separating the green body surface 18 from the second mold surface 24. The space 26 represents a desired thickness of a bond coat material to be joined to the green body 16.

Figure 4:
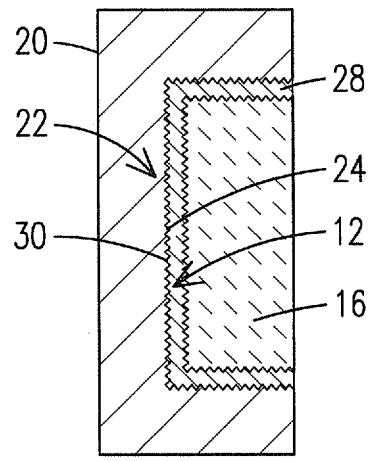
Figure 5:
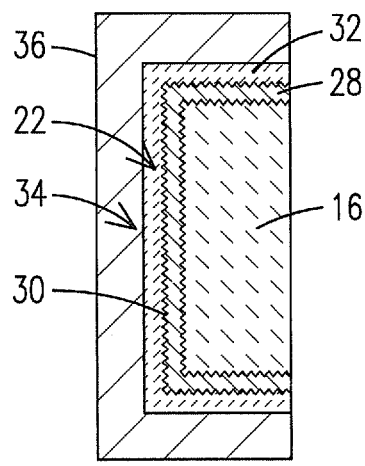

A bond coat material 28 is then cast in slurry form into the space 26 and allowed to solidify as illustrated in FIG. 4. The slurry cooperates with the surface roughness 12 on the outer surface 18 of the green body 16 to form a desired mechanical interconnection between the green body 16 and the bond coat material 28. Furthermore, the surface roughness 22 on the interior surface 24 of the mold 20 is transferred into the bond coat material 28, such that when the green body 16 with coating 28 is removed from the mold 20, its outer surface 30 is available for receiving a thermal barrier coating material 32 to form a thermally insulated component 34 as shown in FIG. 5. The thermal barrier coating material 32 may be applied by a known spray process or it may be cast by using yet another mold 36 (coating mold).

Advantageously, a thermally insulated component according to an embodiment of this invention has a first desired mechanical interconnection between a substrate and a bond coating that is defined by a first designed surface roughness formed on the substrate, and a second desired mechanical interconnection between the bond coating and an overlying ceramic thermal barrier coating that is defined by a second designed surface roughness formed on the bond coat material. The first and second mechanical interconnections may have different physical parameters as may be desired by the designer. For example, the dimensions of the roughness features may be designed to be different between the two mechanical interconnections in response to differences in the physical parameters of the two different slurries used to cast the green body 16 and the bond coat material 28. Furthermore, the physical parameters of the first and/or second mechanical interconnections, and the thickness of the bond coat material may vary from one region of the component to another. For example, a leading edge of an airfoil component may be subjected to more severe impact damage than the remainder of the airfoil during operation of a gas turbine engine. That airfoil manufactured in accordance with the present invention may have a thicker layer of the bond coat material in the leading edge area and/or it may have a mechanical interconnection in the leading edge area that provides more surface area contact between the two material layers (i.e. a more aggressive surface roughness pattern).

Figure 6:
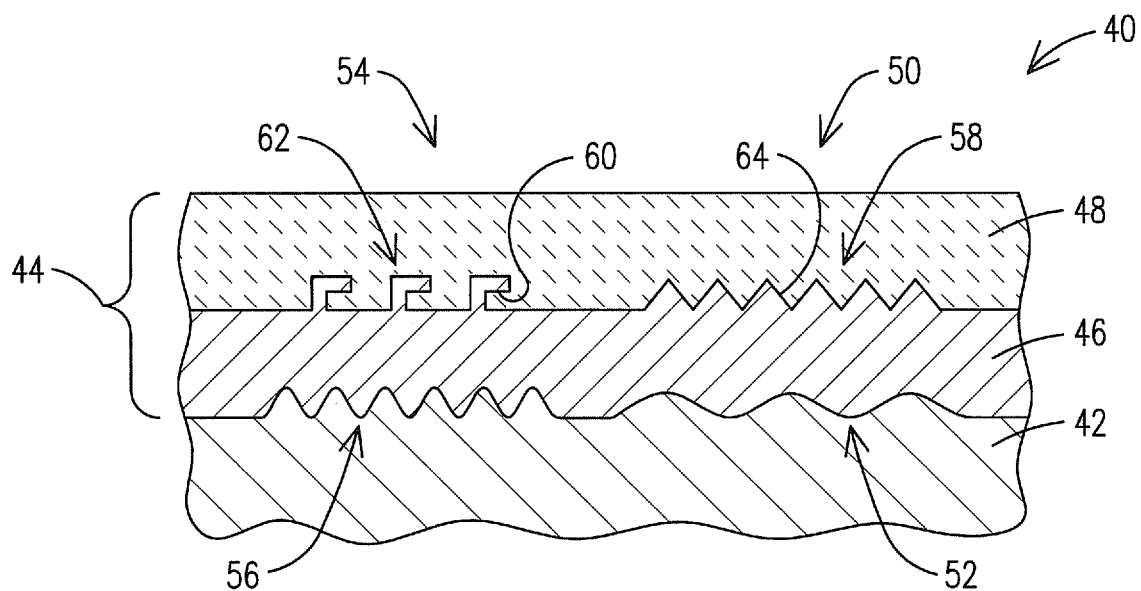
FIG. 6 is a cross sectional view of a gas turbine component in accordance with an embodiment of the invention.

FIG. 6 is an illustration of one such thermally insulated component 40 in accordance with an embodiment of the invention. The component 40 includes a substrate 42 protected by a thermal barrier coating 44 which varies from one region of the component to another. The thermal barrier coating 44 includes a layer of bond coat material 46 and a top layer of ceramic insulating material 48. In a first region 50 of the component 40, such as a suction side of an airfoil or a straight region of a combustor transition piece, the mechanical interconnection 52 between the substrate 42 and the bond coat material 46 may be created by a roughness of the substrate surface approximating a sine wave shape with a relatively long period; whereas in a second region 54 of the component 40, such as an airfoil leading edge or a curved region of a combustor transition piece, the mechanical interconnection 56 between the substrate 42 and the bond coat material 46 may be created by a roughness of the substrate surface approximating a sine wave shape with a relatively shorter period. The relatively shorter sine wave shape provides a more aggressive interconnection with more contact area per unit area of surface. Furthermore, the mechanical interconnection 58 between the bond coat material 46 and the ceramic insulating material 48 in the first region 50 may be created by a roughness of the bond coat surface characterized by saw tooth shapes 64; whereas the mechanical interconnection 62 between the bond coat material 46 and the ceramic insulating material 48 in the second region 54 may be created by a roughness of the bond coat surface including protruding undercut shapes 60. The protruding undercut shapes 60 provide a more aggressive interconnection than do the saw tooth shapes 64. Furthermore, the average thickness of the bond coat material 46 may be greater in region 54 than in region 50. Such features may be produced with precision in repeated applications by the molding and casting techniques described above and illustrated in FIGS. 1-5. Thus, the present invention provides degrees of flexibility and precision of control in the design of thermal barrier coating systems that are not available with prior art techniques.

A primary purpose for utilizing a bond coat layer in prior art ceramic thermal barrier systems is to provide a desired degree of roughness in the surface forming the metal-to-ceramic interface, since the cast metallic substrate surface would not provide a desired degree of mechanical interface with the ceramic insulating layer if the bond coat layer were not present. Furthermore, traditional MCrAlY bond coat materials also provide a supply of aluminum for the formation of a protective alumina layer when the component is exposed to high temperatures. In one embodiment of the present invention, the green body 16 of FIG. 2 is cast using an alumina-forming substrate material with a desired engineered surface roughness 12 appropriate for the direct application of the ceramic thermal barrier coating material 32 without any intervening bond coat layer. The surface roughness 12 in such embodiments may correspond to or improve upon the surface roughness that is achieved with the traditional thermally sprayed bond coat material. Thus, in some embodiments, the present invention provides a desired degree of roughness at the surface of the substrate effective to ensure an adequate metal-to-ceramic interface without the need for a bond coat layer.

Figure 7:
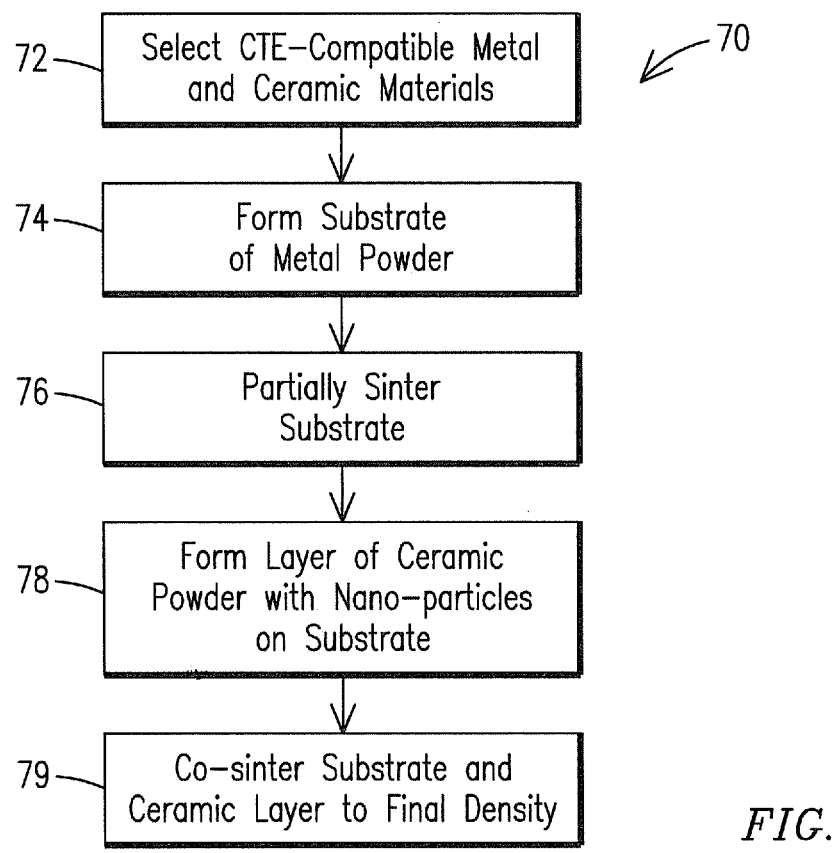
FIG. 7 illustrates the steps in a method in accordance with an embodiment of the invention.

The present invention is advantageously implemented with a process wherein the metal and ceramic materials are selected and processed to be cooperatively matched for both sintering shrinkage and thermal expansion performance. One such process 70 is illustrated in FIG. 7 which includes the steps of: 72—selecting CTE-compatible metal and ceramic materials; 74—forming a substrate from a powder of the metal material; 76—partially sintering the substrate; 78—forming a layer on the substrate from a powder of the ceramic material containing a quantity of nano-particles effective to suppress a sintering temperature of the material; and 79—co-sintering the substrate and the layer of ceramic material to final density. The step 76 of partially sintering the substrate may ensure that the shrinkage of the substrate and the layer during the co-sintering step are approximately the same, and the step 78 of including a quantity of nano-particles may ensure that the sintering temperatures of the substrate and the layer are approximately the same to enable the co-sintering step 79.

One will appreciate that to achieve a desired mechanical interface between the layers, the step 76 of forming the substrate may be accomplished in accordance with the molding process described above with respect to FIGS. 1 and 2, and the step 78 of forming a layer on the substrate may be accomplished in accordance with the molding process described above with respect to FIGS. 3 and 4. The result is a layered material system having a fully coherent strain-free interlayer consisting of interspersed elements of both constituents along an interface defined by an engineered surface roughness topography. The resulting co-processed system is dense and dimensionally stable and may be used in advanced modular inserts for aggressive, impact resistant, high temperature gas turbine applications. In various embodiments, the methods disclosed herein permit the co-processing of a low expansion alloyed refractory metal system based on chromium, molybdenum, niobium, tantalum, tungsten and/or iron with a sinter-active ceramic powder thermal barrier overlay composition employing a bi-modal particle size distribution of alumina, stabilized zirconia and/or yttrium aluminum garnet powders.

The processes and materials described herein allow a much thicker ceramic layer on a metal substrate than was previously possible without the use of a flexible intermediate layer and/or engineered slots in the ceramic layer for strain relief. Whereas prior monolithic ceramic layers in this temperature range were limited to about 0.3 mm thick, the present invention can produce durable monolithic ceramic layers over 1.0 mm thick, including over 2.0 mm thick, for example up to 3.0 mm thick in some embodiments, on superalloy substrates for use over a wide operating temperature range such as 0-1000° C. or 0-1500° C. in some embodiments. Herein, "monolithic" means a layer without a flexible intermediate layer or engineered slots for strain relief.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A thermally insulated component comprising:
   a green body comprising first and second major sides, which are opposite one another, first and second minor sides, which are opposite one another and which extend between the first and second major sides, and a first powder,
   the green body defining, along the first major side and the first and second minor sides, a first surface that is integral to the green body, substantially surrounds and extends along only the first major side and the first and second minor sides of the green body and defines first and second engineered surface roughness characteristics within first and second regions of the first surface, respectively, the first engineered surface roughness characteristic having a mechanical interconnection having a plurality of protruding undercut shapes; and
   a monolithic ceramic insulating layer that comprises a second powder, coats the first surface and defines a second surface,
   wherein the protruding undercut shapes extend into the monolithic ceramic insulating layer and the second surface defines third and fourth engineered surface roughness characteristics within first and second regions of the second surface, respectively, and each protruding undercut shape comprises:
a planar surface;
a boss extending normally from a proximal end thereof at the planar surface to a distal end thereof remote from the planar surface; and
a hook element extending perpendicularly from the distal end of the boss, the hook element having a length which is perpendicular to a length of the boss, from the proximal end thereof to the distal end thereof, which traverses an entirety of the distal end of the boss and protrudes from a plane of a side of the boss, and which is at least as long as the length of the boss.

2. The thermally insulated component of claim 1, wherein:
the first powder is alumina-forming.

3. The thermally insulated component of claim 1, wherein:
the first surface is a substantially spatially inverted replica of a substrate mold surface having a tomo-lithographically-formed surface topography.

4. The thermally insulated component of claim 1, wherein:
the first surface is a substantially spatially inverted replica of a substrate mold surface that comprises a surface topography that comprises protruding undercuts.

5. The thermally insulated component of claim 1, wherein:
the first engineered surface roughness characteristic facilitates direct application of the monolithic ceramic insulating layer onto the first surface.

6. The thermally insulated component of claim 1, further comprising:
a sufficient number of nanoparticles in the second powder to reduce a co-sintering temperature of the first powder to the second powder.

7. The thermally insulated component of claim 1, wherein:
a shrinkage of the first powder during co-sintering and a shrinkage of the second powder during the co-sintering are approximately identical.

8. The thermally insulated component of claim 1, wherein:
a sintering temperature of the first powder and a sintering temperature of the second powder are approximately identical.

9. The thermally insulated component of claim 1, wherein:
the ceramic insulating material employs a bi-modal particle size distribution of alumina, stabilized zirconia, and/or yttrium aluminum garnet powders.

10. The thermally insulated component of claim 1, wherein:
the ceramic insulating material defines a monolithic ceramic insulating layer that has a thickness between approximately 1.0 mm and approximately 3.0 mm.

11. A thermally insulated component comprising:
a green body comprising first and second major sides, which are opposite one another, first and second minor sides, which are opposite one another and which extend between the first and second major sides, and a first sintered powder,
the green body defining, along the first major side and the first and second minor sides, a first surface that is integral to the green body, substantially surrounds and extends along only the first major side and the first and second minor sides of the green body and defines first and second engineered surface roughness characteristics within first and second regions of the first surface, respectively, the first engineered surface roughness characteristic having a mechanical interconnection having a plurality of protruding undercut shapes; and
a monolithic ceramic insulating layer that comprises a second sintered powder, coats the first surface and defines a second surface,
wherein the protruding undercut shapes extend into the monolithic ceramic insulating layer, the second surface defines third and fourth engineered surface roughness characteristics within first and second regions of the second surface and a first portion of the first sintered powder is co-sintered to a first portion of the second sintered powder, and each protruding undercut shape comprises:
a planar surface;
a boss extending normally from the planar surface; and
a hook element extending perpendicularly from a distal end of the boss, the hook element having a length which is at least as long as a length of the boss.

12. The thermally insulated component of claim 1, wherein the second engineered surface roughness characteristic is different from the first engineered surface roughness characteristic.

13. The thermally insulated component of claim 12, wherein the third and fourth engineered surface roughness characteristics are both different from the first and second engineered surface roughness characteristics.

14. The thermally insulated component of claim 1, wherein the second engineered surface roughness characteristic has saw toothed shapes, the third engineered surface roughness characteristic has wavy shapes with a first periodicity and the fourth engineered surface roughness characteristic has wavy shapes with a second periodicity.

* * * * *